United States Patent [19]

Hermann et al.

[11] Patent Number: 5,255,350
[45] Date of Patent: Oct. 19, 1993

[54] PROCESS FOR COMPUTING DYEING AND PRINTING RECIPES IN ACCORDANCE WITH A GIVEN SHADE

[75] Inventors: Hanspeter Hermann, Lörrach, Fed. Rep. of Germany; Raymond Défago, Riehen; Peter Franceschini, Movelier, both of Switzerland

[73] Assignee: Ciba-Geigy Corporation, Ardsley, N.Y.

[21] Appl. No.: 659,786

[22] Filed: Feb. 22, 1991

[30] Foreign Application Priority Data

Mar. 2, 1990 [CH] Switzerland ............................ 674/90

[51] Int. Cl.⁵ .............................................. G06K 15/00
[52] U.S. Cl. ..................................... 395/109; 358/520
[58] Field of Search ................ 395/101, 109; 346/157; 358/80, 75; 355/38

[56] References Cited

U.S. PATENT DOCUMENTS 5,087,126  2/1992  Pochieh ............................... 355/38

FOREIGN PATENT DOCUMENTS 0351188   1/1990  European Pat. Off. .
2452113   5/1976  Fed. Rep. of Germany .
3200292   9/1982  Fed. Rep. of Germany .
3422285   4/1988  Fed. Rep. of Germany .
2577670   2/1985  France .
WO8909383 10/1989 PCT Int'l Appl. .
WO8912552 12/1989 PCT Int'l Appl. .

OTHER PUBLICATIONS

F. J. J. Clarke, et al, JSDC, 1984, 128–132.
R. G. Kuehni, JSDC, 1984, 281–282.
W. Baumann et al, JSDC, 1987, 100–105.
R. McDonald, JSDC, 1980, 372–376, 418–432, 486–497.
D. Randall et al, Amer. Dyestuff Reporter Aug. 1988, 44–47, 78.
R. A. Stanziola, Textile Chemist and Colorist May 1979, 91–94.
R. McDonald, Textile Chemist & Colorist, Jun. 1988, 31–37.
V. C. Gupte, et al, The Indian Textile Journal 1983, 65–75.
U. Skorna, Melliand Textilberichte, Sep. 1989, 693–696.
Bayer-Farbenrevue, Farbmessung in der Textilindustrie 1986, 1–65.
W. Cornelius, Melliand Textilberichte Jan. 1990, 48–50.
W. Baumann et al, Textilveredlung 21 (1986) 299–304.
P. Rabe et al, Melliand, Feb. 1957, 173–177.
R. G. Kuehni, Textile Chemist & Colorist, Apr. 1978, 22–25.
E. Allen, Journal of the Optical Society of America, 1966, 1256–1259.
A. R. Robertson, Rep. Progress in Phys. 1978 471, 488–495, 500–503.

Primary Examiner—Arthur G. Evans
Attorney, Agent, or Firm—Marla J. Mathias; George R. Dohmann

[57] ABSTRACT

A process for computing a dyeing or printing recipe corresponding to a given shade, wherein a) a given shade in a FTa*b* colour space is defined, where FT is a depth of shade value which, irrespective of hue, defines points of equal colour strength which by definition lie in a plane of the FTa*b* colour space as defined, and a* and b* are values of the CIELab colour coordinate system, b) the FTa*b* colour space for each depth of shade plane is segmented into triangular levels by means of the a* and b* values of the dyes to be used for colour matching, c) in each defined depth of shade plane the given a* and b* values correspond to a specific ratio of the dyes of the suitable segment of the colour space, and d) the ratio of the dyes of the suitable segment is obtained by an iteration method.

The process makes it possible to formulate dyeing and printing recipes accurately in accordance with a given reference shade.

11 Claims, 3 Drawing Sheets

PROCESS FOR COMPUTING DYEING AND PRINTING RECIPES IN ACCORDANCE WITH A GIVEN SHADE

BACKGROUND OF THE INVENTION

The present invention relates to a process for computing dyeing and printing recipes in accordance with a given reference shade by defining each hue of a reference shade as colour position in a colour space, and, in accordance with these data of said colour space, matching each hue from a single dye, from a mixture of two dyes or from a mixture of three dyes.

All sectors of industry engaged in colouring must carry out colour matching with reference shades or to make new colour and design combinations. In recent years technological advance in this branch of industry has been substantial as a result of the linkage of design, coloured computer graphics, colorimetry and computer stations.

It is possible at the present rime to display a reference shade or pattern on a monitor using a scanner or video camera and to vary it, as desired, with respect to form and colour and also to print this design on to any substrate using a colour printer, for example an ink-jet printer. Matching the reference shade however, still poses problems, as the desired shades have to be selected from a comprehensive colour atlas. Collections of up to 15,000 different shades are known, as are also computer-assisted systems which are able to store a very large number of shades which can be displayed on a monitor or printed on to any substrate using a colour printer. The traditional electronic colour atlases provide the recipes for each class of dye, which may differ from one substrate to another.

Creating such colour atlases is very troublesome and time-consuming. The colour atlases are naturally only valid for as long as the basic dyes, the methods of application and and the substrates do not change. Any change necessitates an at least partial or even complete recreation of the colour atlas. This procedure is therefore extremely uneconomic.

Colorimetric match predictions by means of spectrophotometry are also known. This kind of recipe formulation also has deficiencies when colour matching, as the known programs are insufficiently selective and usually provide a host of recipes, so that specialists have to be called in to choose the "right" recipes from these suggestions. A trial dyeing is then prepared from these selected recipes and then corrected once or more than once, according to the experience of the specialist.

All colorimetric systems which are at present known and used in practice for matching a reference shade use reflectance curves of the reference shade and the attempt is made, by mixing known dyes, to approximate to the reflectance curves of the reference shade.

Because the reflectance curves are dependent on the dyes, and as it is normally not possible to use the dyes used in the reference shade, the matching will generally have a reflectance curve which deviates more or less from the reference shade. To keep the deviation as small as possible, mixtures of different dyes are used, thereby compensating for differences in the reflectance curves. This procedure is time-consuming and requires great experience with the dyes used.

SUMMARY OF THE INVENTION

The process of this invention eliminates the deficiencies of the known systems.

Specifically, the present invention relates to a process for computing a dyeing or printing recipe corresponding to a given shade, wherein a) a given shade in a $FTa*b*$ colour space is defined, where FT is a depth of shade value which, irrespective of hue, defines points of equal colour strength which by definition lie in a plane of the $FTa*b*$ colour space, and $a*$ and $b*$ are values of the CIELab colour coordinate system, b) the $FTa*b*$ colour space for each depth of shade plane is segmented into triangular levels on the basic of the $a*$ and $b*$ values of the dyes to be used for colour matching, c) in each defined depth of shade plane the given $a*$ and $b*$ values correspond to a specific ratio of the dyes of the suitable segment of the colour space, and d) the ratio of the dyes of the suitable segment is calculated by an iteration method.

The distinguishing feature of the process of this invention is that each reference shade can be exactly matched because what is sought is not the best approximation to the reflectance curve of the reference shade, but the colour of the reference shade in the colour space is exactly defined and precisely this colour position in the colour space is sought for making the match prediction.

The process of this invention makes use of the known CIELab colour coordinate system, except that the lightness axis $L*$ is replaced by the depth of shade value FT. The advantage of this procedure is that colour positions of equal depth of shade or colour strength lie in a plane of the colour space.

A suitable depth of shade value FT is, for example, the standard depth concentration, such that the standard depth concentration is not only indicated in the known depths of 2/1, 1/1, ⅓, 1/6, 1/12 and 1/25, but can be still further subdivided, for example, into steps of a 1/10 depth or lower.

Further, as depth of shade values it is possible to use values obtained from reflectance measurements which are obtainable as reported in Textilveredelung, 1986, pp. 299-304. It has been found, however, that these values still do not suffice for all purposes and need further improvement.

One advantage of the dividing the colour space into planes of different colour strength, all hues on one plane having the same depth of shade, is that, when fixing or determining the depth of shade or colour strength of the reference shade to be matched, the corresponding depth of shade plane of the dyes to be used is known, and the desired chromaticity, $a*$ and $b*$ values, can be ascertained either from a single dye, a mixture of two dyes or a mixture of three dyes. As the known depth of shade plane also gives the concentration of each dye for this depth of shade plane, the ratio of mixtures of the dyes must be determined by simple iteration methods. Suitable iteration methods are, typically, purely computational or geometric, especially computer-controlled trial-and-error methods. A possible iteration method for subdividing the triangular level is shown in FIG. 3.

The $a*$ and $b*$ values correspond to the data of the CIELab colour coordinate system and denote the chromaticity. The colour positions of different depth of shade or colour strength lie in the $FTa*b*$ colour space on different levels above one another. When using a depth of shade value obtained from reflectance measurements, it has been found useful to impart added weight to the data through the colour sensitivity of the eye or through the colour impression.

The planes of the FTa*b* colour space are segmented into triangular levels, such that the corner points of the triangular levels correspond to the colour position of the dyes intended for matching. The individual triangular levels of each depth of shade plane do not overlap, so that each colour position within this colour space fixed by the FTa*b* calibration data is defined only by a single recipe, which consists either of only one single dye if the desired colour position accords with the FTa*b* values of a single dye, or the recipe is a mixture of two dyes if the desired colour position lies on the normally non-linear connecting line of two dyes, or the recipe is a mixture of three dyes, in which case the ratio of these three dyes is computed by an iteration method.

The division of the FTa*b* colour space into triangular levels can be carried out with a very wide range of dyes, the sole criterion being that the colour space is as well covered as possible. The dyes themselves can be selected in accordance with the most diverse criteria, such as fastness properties, price, availability, inventory and the like.

Figure 1:
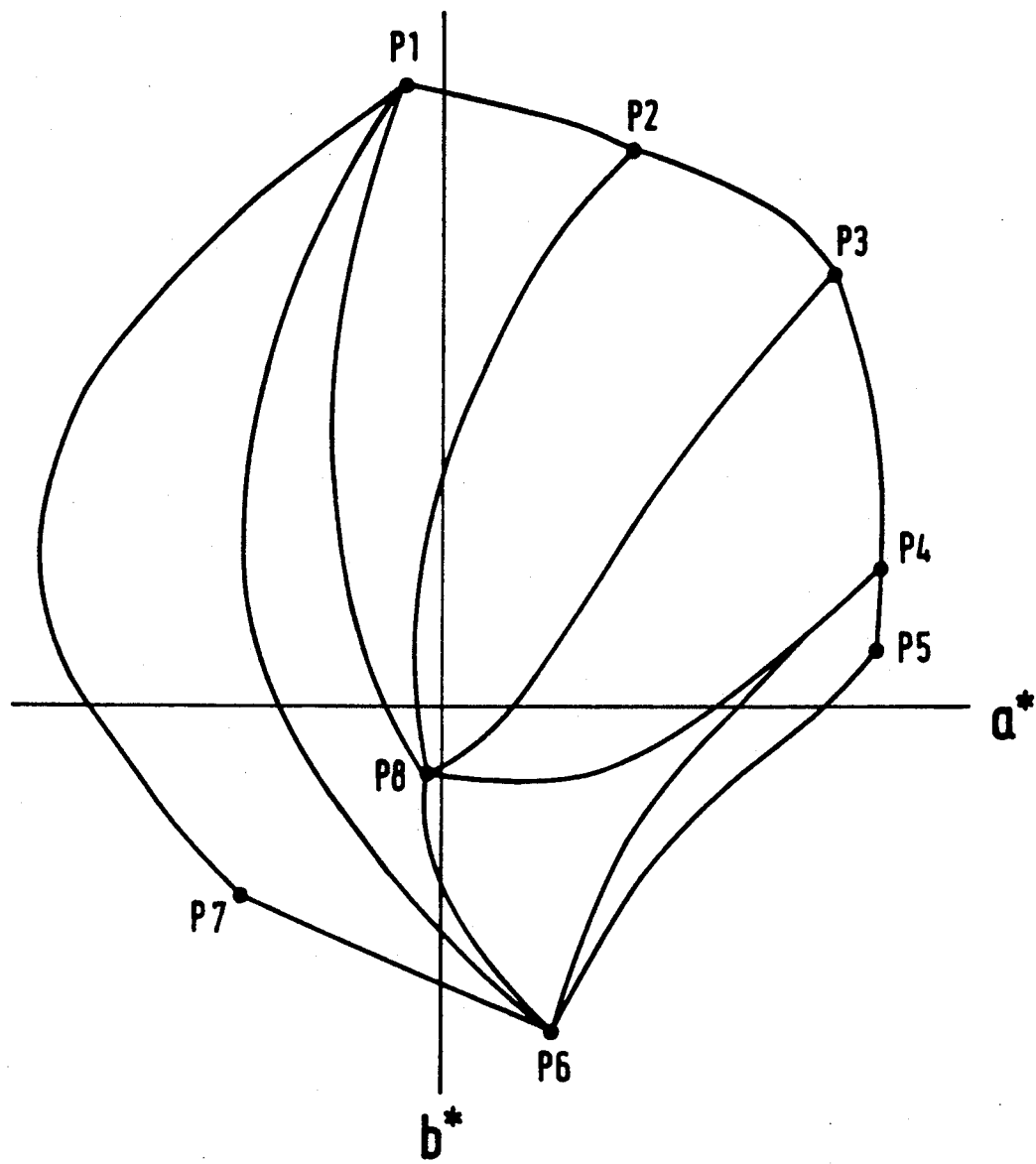
FIG. 1 shows the segmentation of the colour space in a depth of shade into seven segments, the terms P1 to P8 corresponding to the FTa*b* values of the dyes yellow (P1), yellow (P1), golden yellow (P2), orange (P3), red (P4), reddish-blue (P5), blue (P6), turquoise (P7) and black.

The connecting lines of the dyes drawn FIG. 1 are formed by mixing the dyes in specific percentages at a given depth of shade. Where the calibration data are known, the a* and b* coordinates can be determined or evaluated by a commercially available colorimeter.

Figure 2:
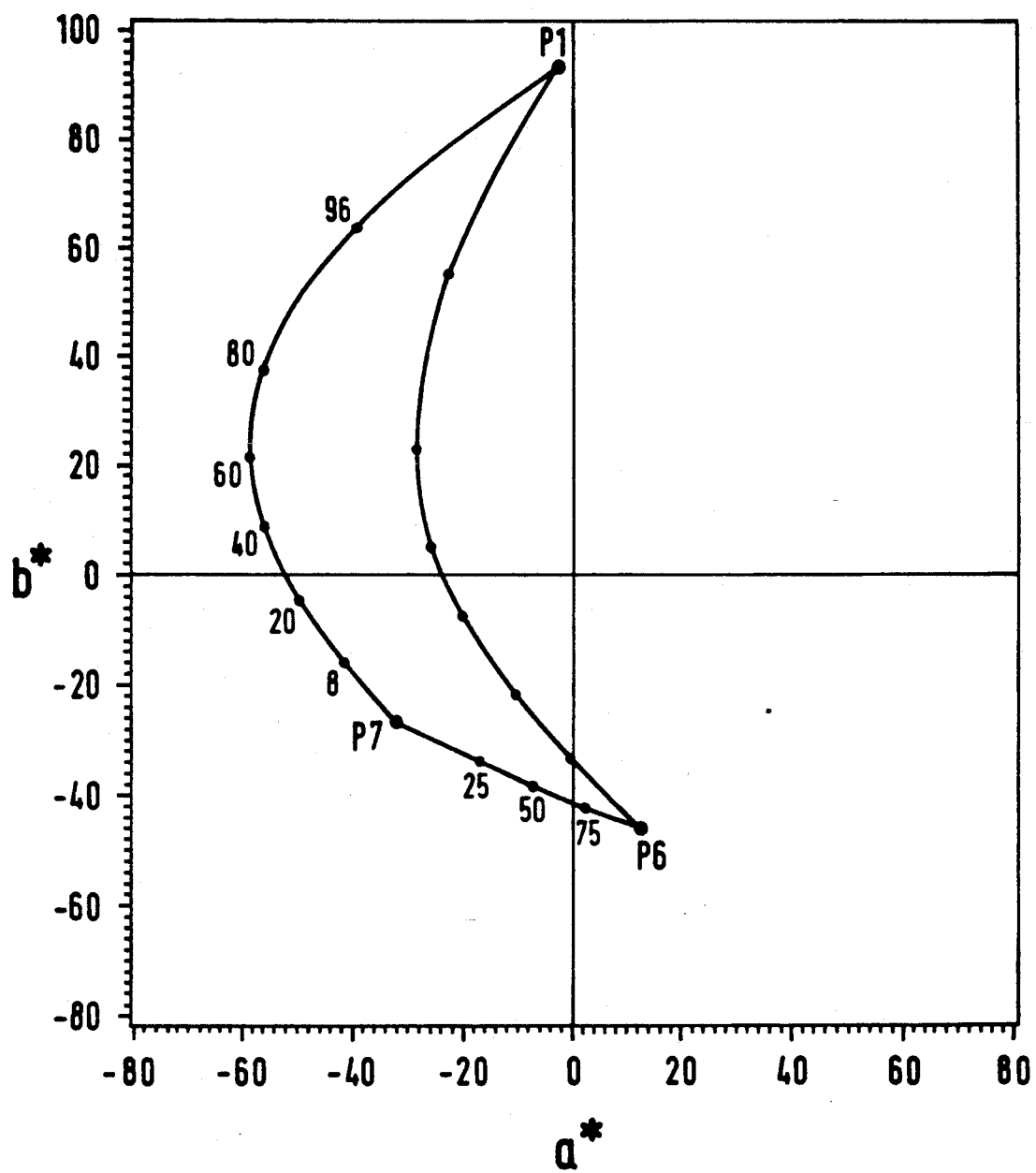

FIG. 2 shows a single segment which is the triangular level represented by the points P1, P6 and P7 in FIG. 1. The points PI, P6 and P7 define positions which correspond 100% to the dye having the data P1, P6 or P7. The numbers next to the line P1P7 define the percentage amount of dye having the calibration data P1 of the mixture of P1 and P7. The numbers next to the line P6P7 define the percentage amount of the dye P6 of the mixture of P6 and P7.

Figure 3:
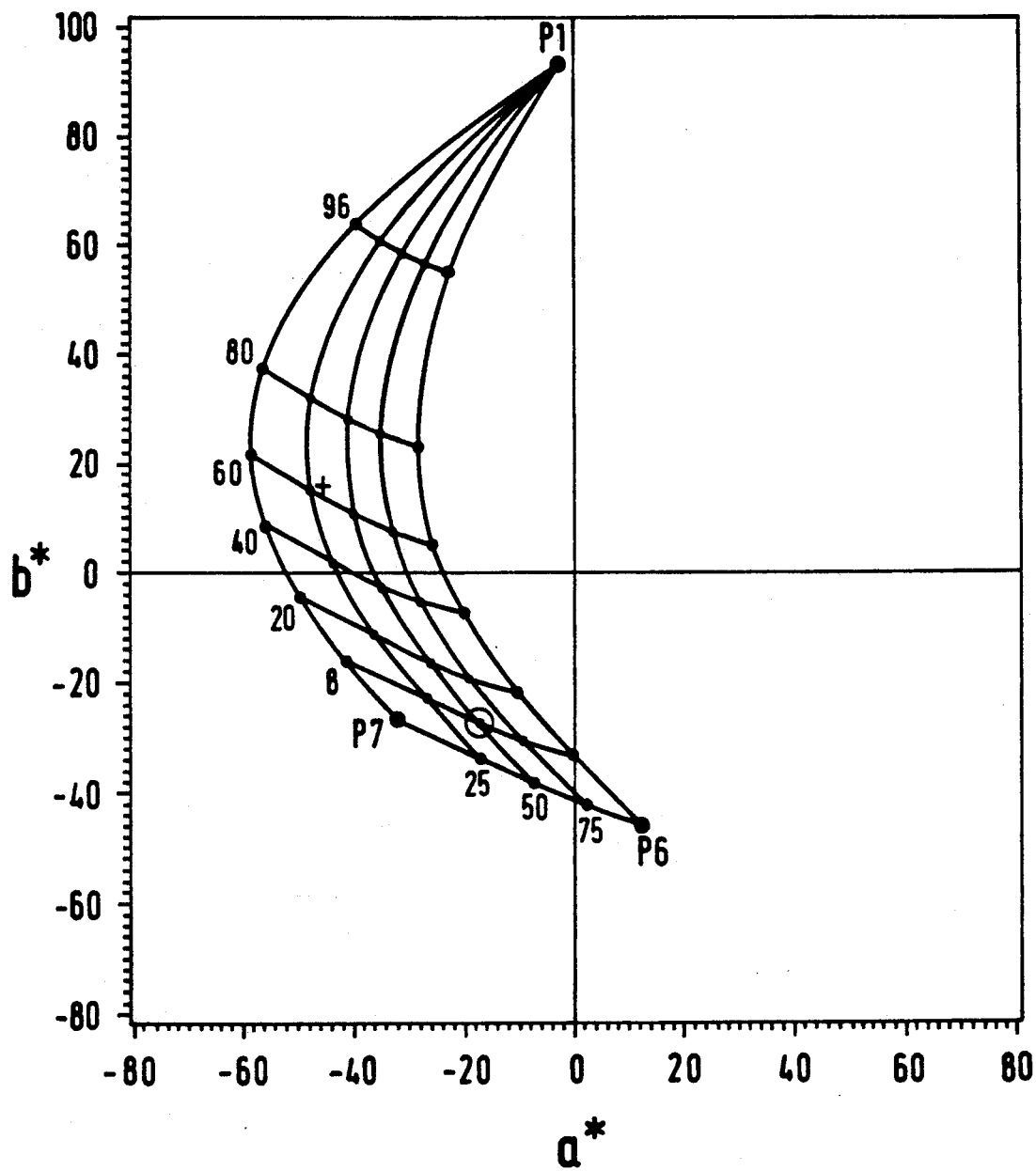

FIG. 3 shows the same segment as FIG. 2, except that the segment has been structured. The structuring is based on the percentage amounts of the dyes having the calibration data P1, P6 and P7. FIG. 3 further shows a possibility of using an iteration method at one position in the segment. In the process of this invention it is preferred to use a computer-aided or computer-controlled iteration method.

DETAILED DESCRIPTION OF THE PREFERRED EMBODIMENTS

A plane of the FTa*b* colour space is illustrated in FIGS. 1, 2 and 3. The depth of shade value FT corresponds, for example, to a ⅔ standard depth concentration. The dye concentration which is necessary for dyeing a specific substrate in this depth is known for each depth of shade value FT, for example for 1/10, 2/10 or 1/1 standard depth concentration. The dye concentration depends, for example, on the dye itself, the desired depth of shade, the method of application, and the substrate to be dyed or printed.

As the substantivity of many dyes is not linear it is only possible in a few cases to deduce from a known concentration, for example a 1/1 standard depth concentration, the concentration for another standard depth concentration. As a rule it is necessary to compute the concentrations for different standard depth concentrations, for example 1/10, ⅓, 1/1 and 2/1, and to plot a curve characteristic for each desired dye and for the material which it is desired to dye. The concentrations of commercially available dyes required for different depths of shade on different substrates are usually known.

FIGS. 1, 2 and 3 show the a* and b* axes of the FTa*b* colour space.

For example, in the process of this invention for matching a shade, the procedure will normally be that the colour position of the shade to be matched is defined in the FTa*b* colour space. The definition via the colour position of the shade to be matched is made by, for example, a colour printer, such as an ink-jet printer, which is used for development of the design or the shade. The a* and b* values of the colour position in the FTa*b* colour space are thereby defined. The depth of shade value FT can be computed, for example, from a standard depth concentration colour chart. To this end a standard depth concentration chart or a corresponding concentration curve is prepared from each dye in a manner known per se, for example for the 8 dyes shown in FIG. 1.

The segmentation of the colour space depends, for example, on the aforementioned criteria such as application properties, price, availability and the like. After the dyes have been selected for segmentation and their calibration data have been computed from reflectance measurements at different concentrations in per se known manner and stored in a computer, the segmentation of the FTa*b* colour space is complete. The FT value of the shade to be matched or the FT plane is known. Using this stored information, the dye combination elements for a defined colour position in the FTa*b* colour space as well as the concentration of each dye for a specific FT value are determined.

If, for example, a green shade in a ⅔ standard depth concentration with known a* and b* values is sought, the following information is immediately evident, provided the a* and b* values do not accord with a single dye or a mixture of two dyes: the shade consist of amounts of x g/kg of dye having the calibration data P1,
y g/kg of dye having the calibration data P6 and
z g/kg of dye having the calibration data P7.

The values for x, y and z correspond to the dye concentration for dyeing or printing a specific substrate in a ⅔ standard depth concentration.

The percentage amounts of a dye for a ⅔ standard depth concentration are calculated by means of a computer-controlled iteration method, such that the sum of the percentages must be 100. If the percentage of dye having the calibration data P1 is, for example, 50%, then the dye concentration necessary for a ⅓ standard depth concentration can be read off from the concentration curve of this dye referred to above. If the percentage of dye with the calibration data P7 is, for example, 25%, then the dye concentration necessary for a 1/6 standard depth concentration can be read off from the concentration curve of this dye referred to above.

A preferred embodiment of the process of this invention comprises recording a given shade and, if appropriate, a given pattern electronically, preferably digitally, using a scanner or a video camera, displaying said colour or said form on a monitor and correcting it with respect to form and colour, and then printing it on any substrate using a printer, for example an ink-jet printer, whereby the colour position in the FTa*b* colour space is defined and is stored and can be matched.

Of all dyes used in the process of this invention for a colour matching, the dye calibration data, reflectance values, from which a* and b* values are obtained, are stored.

A particularly preferred embodiment of the process of this invention comprises obtaining the desired ratio of the dyes of the segment by means of a computer-controlled iteration method.

Another preferred embodiment of the process of this invention comprises using dyes as corner points of a segment which meet defined criteria, especially with respect to their application properties, such as compatibility, degree of fastness, price, dyes held in stock, and the like. This means that, in the process of this invention, dyes can be chosen for different segmentations. After determining the FTa*b* values of the dyes which can be calculated from reflectance curves, and after segmentation of the colour space plane, match prediction of the desired shade is made in accordance with the process of this invention.

A very particularly preferred embodiment of the process of this invention comprises formulating print recipes.

In the process of this invention it is possible to use dyes belonging to the widest range of dye classes for matching a reference shade, irrespective of whether they are water-soluble or dispersed dyes. It is preferred to use disperse, acid, metal complex, reactive, vat, sulfur, direct and pigment dyes as well as cationic dyes. Also suitable for use are natural dyes, development dyes such as naphthol dyes, and food dyes. All mixtures of the cited dyes are also suitable.

Reference is made to the Colour Index for examples of the different classes of dyes: Colour Index, Third Edition, 1970/1971: Acid Dyes, Vol. 1, pp. 1001–1562; Basic Dyes, Vol. 1, pp. 1607–1688; Direct Dyes, Vol. 2, pp. 2005–2478; Disperse Dyes, Vol. 2, pp.2479–2743; Food Dyes, Vol. 2, pp. 2773–2788; Leather Dyes, Vol. 2, pp. 2799–2835; Natural Dyes, Vol. 3, pp.3225–3256; Pigments, Vol. 3, pp. 3267–3390; Reactive Dyes, Vol. 3, pp. 3391–3560; Solvent Dyes, Vol. 3, pp. 3563–3648; Vat Dyes, Vol. 3, pp. 3719–3844.

The process of this invention is suitable for colour matching on all substrates, especially on textile fibre materials such as silk, leather, wool, polyamide fibres, polyurethane fibres, cellulosic fabrics such as cotton, linen and hemp, as well as cellulose viscose and viscose staple, polyester fibres, polyacrylic fibres, paper, foils and metals such as polymer-coated aluminium. Blends of the aforementioned fibres are also suitable, for example blends of cotton with polyester or polyamide fibres.

In the process of this invention it is necessary to indicate the substrate used for colour matching, as the dye concentrations depend, for example, on the substrate.

The invention further relates to the use of the novel process for obtaining a dyeing or print in accordance with a reference shade.

A preferred feature of the process of the invention is that the process is part of a computer-controlled dyeing cycle or of a computer-controlled printing process.

A particularly preferred feature of the process of this invention is that, in accordance with the criteria, for example with respect to application properties, price and the like, different dyes can be used for the segmentation. For several segmentations of the FTa*b* colour space, the FTa*b* data of the dyes corresponding to the corner points of the triangular levels and to the dye concentration for each FT plane, are stored for each specific substrate in a computer.

The invention further relates to a system for electronic colour matching comprising the following elements:

a) a scanner or a video camera for digitalising a reference shade, b) a computer-aided design apparatus for displaying and correcting the reference shade on a monitor, c) a colour printer, for example an ink-jet printer, for displaying the reference shade or the corrected shade on any substrate and for calculating the coordinates for each shade or each corrected shade in the FT-a*b* colour space, d) a computer which stores the FTa*b* values of the dyes to be used and and computes the recipe by means of an iteration method.

The process of this invention and the use of said process and a colour matching system with which the process is carried out afford the advantage that, for example, a whole colour atlas does not need to be recreated when a dye of a range of a dye manufacturer is changed, and that it is only necessary to store the calibration data of the new dye, so that the combination shades of two dyes and the mixtures of three dyes can be computed.

A further advantage of the process of the invention is that all data necessary for colour matching, calibration data of the dyes as well the iteration method, can be stored in a computer or on a diskette, so that, without a single dyeing, a substantial number of "colour atlases" are available solely by changing the diskette or inputting calibration data.

The dyes used in the process of this invention can be commercially available dyes.

DESCRIPTION OF THE FIGURES

FIG. 1 is a schematic of a depth of shade plane of the FTa*b* colour space with a segmentation into triangular levels, in which the points P1 to P8 are corner points of the triangular levels and define dye data, FTa*b* values.

FIG. 2 is a schematic of a section of the FTa*b* colour space, the segment which is characterised by the FTa*b* values of the dyes P1, P6 and P7. The numbers next to the P1P7 line define the percentage amount of the dye P1 of the mixture of dyes having the calibration data of P1 and P7. The numbers next to the P6P7 line define the percentage amount of the dye P6 of the mixture of dyes having the calibration data of P6 and P7.

FIG. 3 is a schematic of the structuring of the segment shown in FIG. 2. This structuring is simultaneously the start of a possible iteration method for defining any position in this segment.

The invention is illustrated by the following Examples, in which parts and percentages are by weight.

EXAMPLE 1

In the following matching of a shade, it is assumed that the calibration data of the dyes to be used for the colour matching are available, that the colour space is segmented by the calibration data of different dyes, and that the segmentation corresponds to the segmentation shown in FIG. 1.

The shade for matching is a blue shade having the following characteristic values: $a^* = -18.15$; $b^* = -27.18$; FT=0.66 (⅔ standard depth concentration).

The colour position in the FTa*b* colour space is defined by the given data. The shade for matching lies in the segment which is characterised by the dyes having the coordinates of P1, P6 and P7 (q.v. FIG. 2, ⊙ sign). In order to determine the shade to be matched from the mixture ratio of the dyes of this segment, the segment is structured by computing the a* and b* values of two-dye combination shades (mixture of the dyes having the coordinates: P1 and P6, P1 and P7, P6 and P7). Commercially available colorimeters are able to compute from the stored calibration data of the dyes the a* and b* values of any combinations when the depth of shade or the concentration is known.

The following Tables show the a* and b* values of some two-dye combinations. The dye mixture always relates to the depth of shade value FT=0.66. In the following Tables, FSP1=dye having the coordinates P1, FSP6=dye having the coordinates P6, and FSP7=dye having the coordinates P7, in the FTa*b* colour space.

TABLE 1

| Dye mixture | a* | b* |
| --- | --- | --- |
| 100% FSP1 + 0% FSP7 | −3.45 | 93.87 |
| 96% FSP1 + 4% FSP7 | −40.47 | 63.82 |
| 80% FSP1 + 20% FSP7 | −56.89 | 37.22 |
| 60% FSP1 + 40% FSP7 | −59.21 | 21.48 |
| 40% FSP1 + 60% FSP7 | −56.49 | 8.76 |
| 20% FSP1 + 80% FSP7 | −49.87 | −4.68 |
| 8% FSP1 + 92% FSP7 | −41.68 | −16.02 |
| 0% FSP1 + 100% FSP7 | −32.55 | −26.70 |

TABLE 2

| Dye mixture | a* | b* |
| --- | --- | --- |
| 100% FSP6 + 0% FSP7 | 12.22 | −46.16 |
| 75% FSP6 + 25% FSP7 | 2.24 | −42.79 |
| 50% FSP6 + 50% FSP7 | −7.44 | −38.54 |
| 25% FSP6 + 75% FSP7 | −17.53 | −33.88 |
| 0% FSP6 + 100% FSP7 | −32.55 | −26.70 |

TABLE 3

| Dye mixture | a* | b* |
| --- | --- | --- |
| 100% FSP1 + 0% FSP6 | −3.45 | 93.87 |
| 96% FSP1 + 4% FSP6 | −23.36 | 55.59 |
| 80% FSP1 + 20% FSP6 | −28.91 | 23.00 |
| 60% FSP1 + 40% FSP6 | −26.43 | 5.32 |
| 40% FSP1 + 60% FSP6 | −20.68 | −7.19 |
| 20% FSP1 + 80% FSP6 | −10.97 | −21.17 |
| 8% FSP1 + 92% FSP6 | −0.69 | −33.01 |
| 0% FSP1 + 100% FSP6 | −12.22 | −46.16 |

By combining the calculated a* and b* values, the above structuring leads to FIG. 3, such that all points give 100%. Thus, for example, the first 5 points on the line with 96% FSP1 are made up as follows: 96%, FSP1+0% FSP6+4% FSP7; 96% FSP1+1% FSP6+3% FSP7; 9.6% FSP1+2% FSP6+2% FSP7; 96% FSP1+3% FSP6+1% FSP7; 96% FSP1+4% FSP6+0% FSP7.

The characterisation of the depth of shade value as, for example, a ⅔ standard depth concentration, means that the concentration of these dyes in this depth is known:

dye having the coordinates P1 in FT=0.66: 16.9 g
dye having the coordinates P6 in FT=0.66: 45.4 g/kg
dye having the coordinates P7 in FT=0.66: 48.1 g/kg The desired shade having the data: FT=0.66; $a^* = 18.15$; $b^* = -27.18$ lies in the depth of shade plane FT=0.66 on a point of intersection of 8% FSP1 and 46% FSP6 and 46% FSP7. The sum of the mixture must be 100.

To determine the amounts it is necessary to know the amount of dye required for different depths of shade. At different depths of shade FT, the amount of dye having the coordinates P1 is:

| dye having the coordinates P1 in: | FT = 1.0 | 36.4 g/kg |
| --- | --- | --- |
| | FT = 0.66 | 16.9 g/kg |
| | FT = 0.33 | 8.4 g/kg |
| | FT = 0.16 | 4.1 g/kg |

At different depths of shade FT, the amount of dye having the coordinates P6 is:

| dye having the coordinates P6 in: | FT = 1.0 | 71.3 g/kg |
| --- | --- | --- |
| | FT = 0.66 | 45.4 g/kg |
| | FT = 0.33 | 22.1 g/kg |
| | FT = 0.16 | 10.5 g/kg |

At different depths of shade FT, the amount of dye having the coordinates P7 is:

| dye having the coordinates P7 in: | FT = 1.0 | 79.0 g/kg |
| --- | --- | --- |
| | FT = 0.66 | 48.1 g/kg |
| | FT = 0.33 | 20.9 g/kg |
| | FT = 0.16 | 9.5 g/kg |

The substrate-specific concentration curve can be calculated from the above amounts of dyes having the coordinates P1, P6 and P7. The following amounts in g of dye per kg of print paste result for the desired shade having the data FT=0.66; $a^* = -18.15$; $b^* = -27.18$:

1.35 g/kg of dye having the coordinates of P1
22.14 g/kg of dye having the coordinates of P6
20.9 g/kg of dye having the coordinates of P7.

Cotton fabric is dyed in a blue shade in a standard depth concentration of ⅔ with the above mixture.

The dyes used are reactive dyes having the following structural formulae:

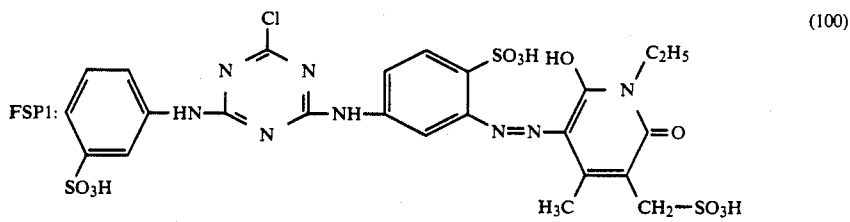

(100)

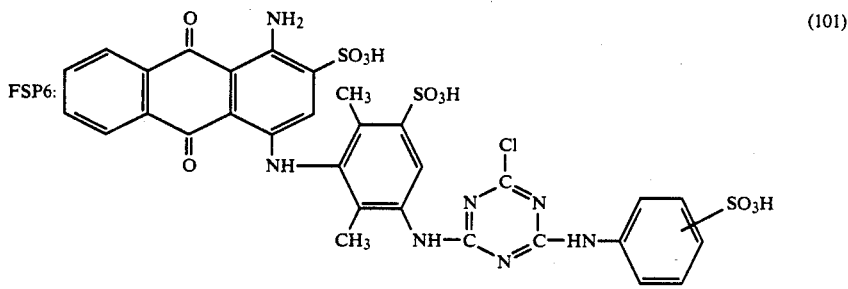

(101)

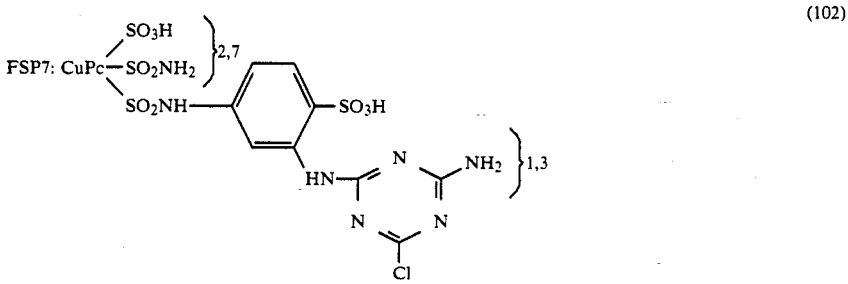

(102)

CuPc = copper phthalocyanine

EXAMPLE 2

For matching, the colour position having the coordinates FT=0.66; a*=−46.00; b*=16.00 are selected. In the following matching of a shade, it is assumed that the calibration data of the dyes to be used for the colour matching are available, that the colour space is segmented by the calibration data of different dyes, and that the segmentation corresponds to the segmentation shown in FIG. 1, and that this segment has been calculated and structured in accordance with Example 1 (cf. FIGS. 2 and 3). The colour position having the desired coordinates lies neither on a point of intersection nor on one of the connecting lines of the coordinates of P1P7, P1P6, P6P7. An iteration method is necessary to compute this colour position and is carried out using a commercially available computer or, in the simplest case, by hand. The coordinates selected for the colour match in the standard depth concentration ⅔ are illustrated in FIG. 3 by the + sign. An iteration method gives 63 parts of the yellow dyeing dye having the coordinates of P1. Regarding the percentage amounts of the dyes having the coordinates of P6 and P7, the following distribution of these dyes can be computed as follows: 26.5% of the dye having the coordinates of P6 and 73.5% of the dye having the coordinates of P7. The yellow component is 63%, so that the remaining 37% in the above ratio of the dyes having the coordinates of P6 and P7 consists of:

9.8 parts of the blue dyeing dye having the coordinates of P6

27.2 parts of the turquoise dyeing dye having the coordinates of P7.

To compute the concentration of the dyes in the print paste, the following concentration is calculated in accordance with the particulars of Example 1 for the depth of shade value FT=0.66 (⅔ standard depth concentration):

10.6 g/kg of the dye having the coordinates of P1

4.4 g/kg of the dye having the coordinates of P6

13.1 g/kg of the dye having the coordinates of P7.

Cotton fabric is dyed with this mixture in the desired green shade in a ⅔ standard depth concentration.

The procedures described in Examples 1 and 2 are repeated, using in place of the dyes having the coordinates P1, P6 and P7 the dyes indicated in the following Table, whose FTa* and b* values are computed as well as their concentration at different depths of shade, to give a dyeing or printing recipe corresponding to a given shade.

| Dye | Shade |
|---|---|
| Structure with HO₃SH₂C, CH₃, N=N, NH, triazine with F, NHCH₂CH₂OCH₂CH₂SO₂CH=CH₂, N-C₂H₅, OH, HO₃S | (103) yellow |
| Naphthalene with SO₃H groups, N=N, NHCOCH₃, triazine with F, NHCH₂CH₂OCH₂CH₂SO₂CH=CH₂ | (104) yellow |
| Naphthalene with SO₃H, N=N, OH, HO₃S, SO₃H, HN-triazine with N(C₂H₅)(phenyl), F | (105) orange |
| Structure with SO₃H, N=N, OH, NH₂, N=N, SO₂CH=CH₂, H₂C=CHSO₂(CH₂)₃CONH, HO₃S, SO₃H | (106) navy blue |
| H₂C=CHSO₂-phenyl-N=N-naphthol with HN-triazine (Cl, NHCH₂CH₂OCH₂CH₂SO₂CH=CH₂), HO₃S, SO₃H | (107) red |
| Naphthalene-SO₃H, SO₃H, N=N, OH, HN-triazine with Cl and NHCH₂CH₂OCH₂CH₂SO₂CH=CH₂, HO₃S, SO₃H | (108) red |
| Naphthalene with SO₃H groups, N=N, naphthalene with SO₃H, N=N, CH₃, HN-triazine with F, NH-phenyl-SO₃H | (109) brown |

| Dye | Shade |
|---|---|
| 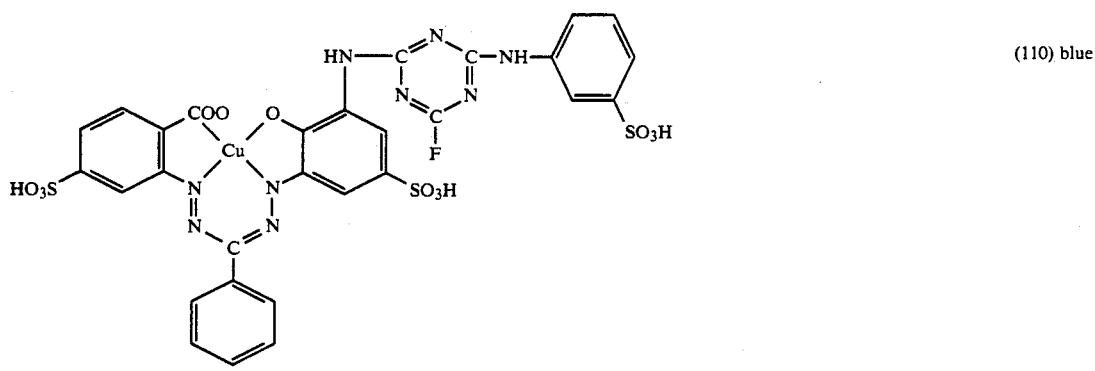 | (110) blue |
| 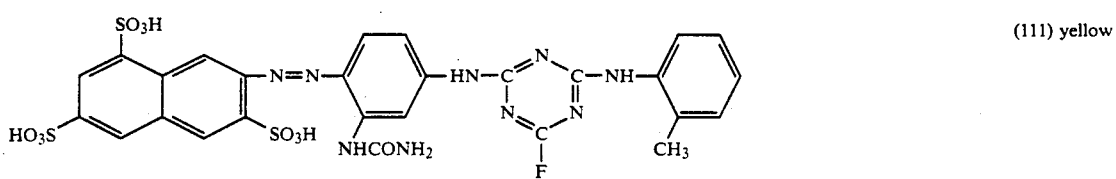 | (111) yellow |
| 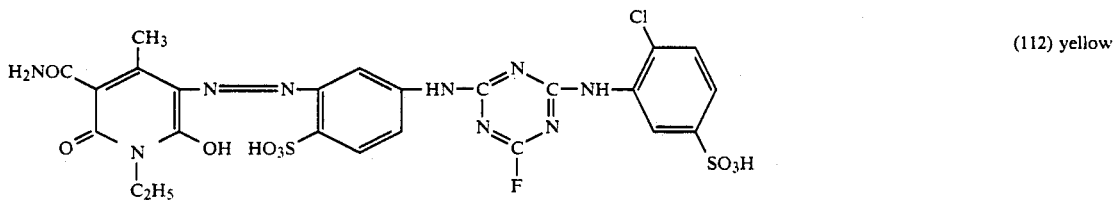 | (112) yellow |
| 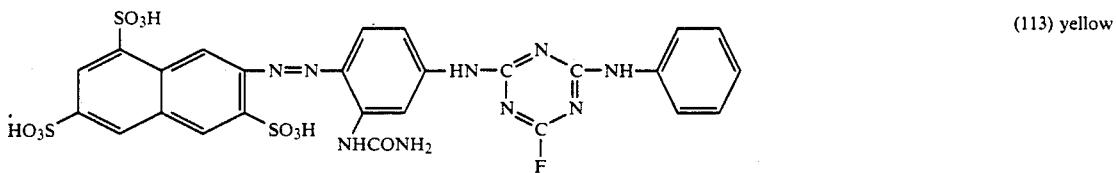 | (113) yellow |
| 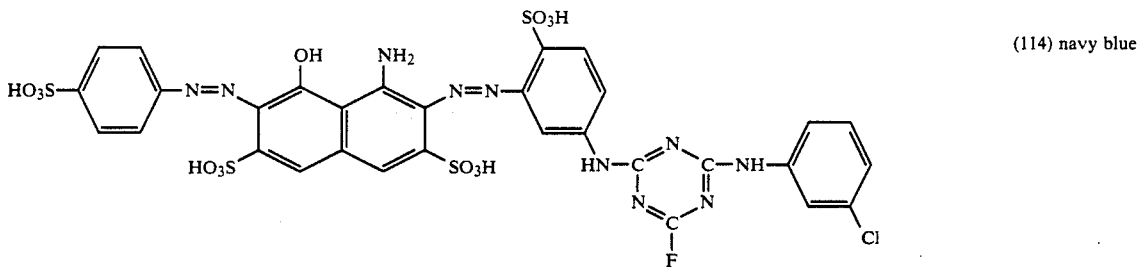 | (114) navy blue |
| 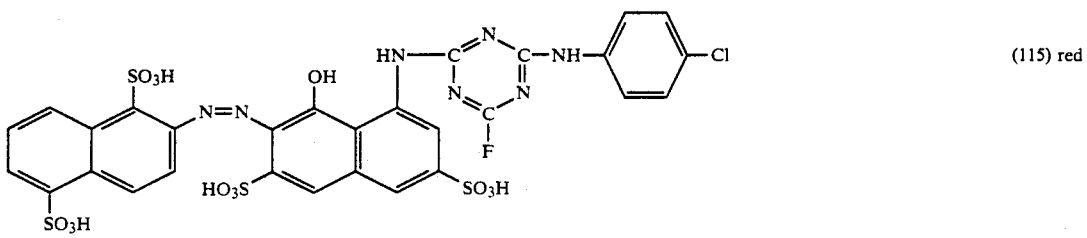 | (115) red |

| Dye | Shade |
|---|---|
| 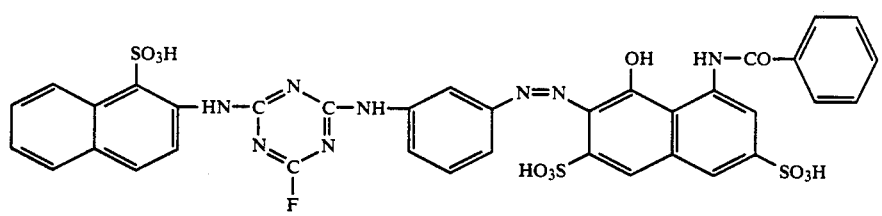 | (116) red |
| 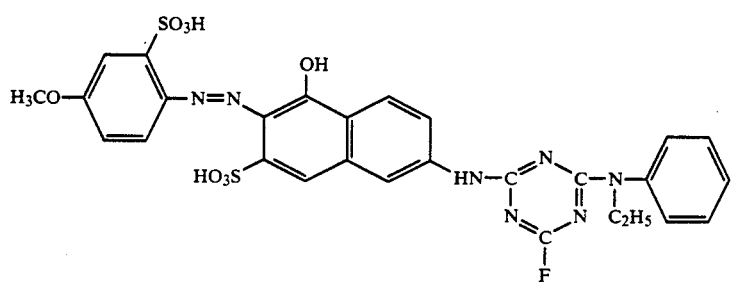 | (117) scarlet |
| 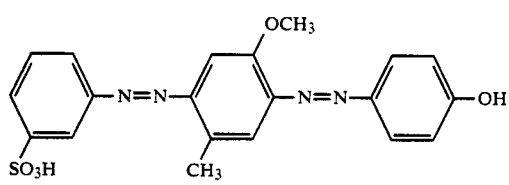 | (118) yellow |
| 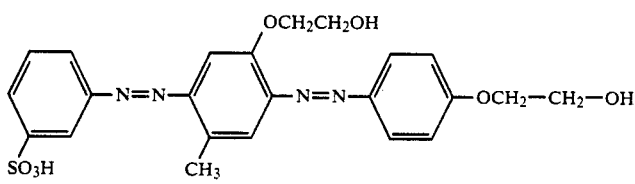 | (119) yellow |
| 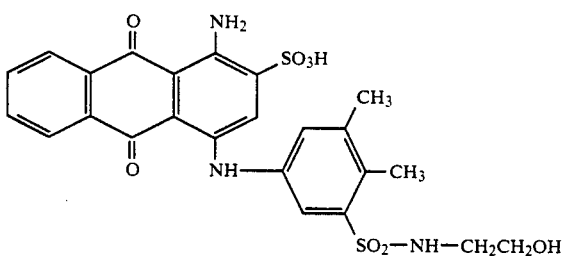 | (120) blue |
| 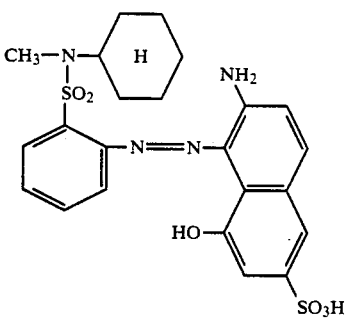 | (121) red |
| 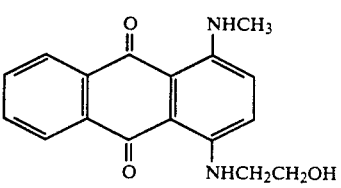 | (122) blue |

-continued
| Dye | Shade |
|---|---|
| 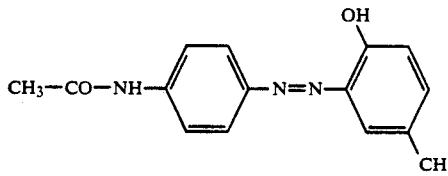 | (123) yellow |
| 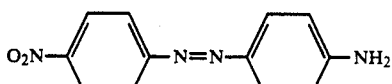 | (124) orange |
| 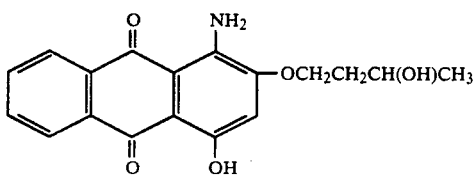 | (125) red |
| 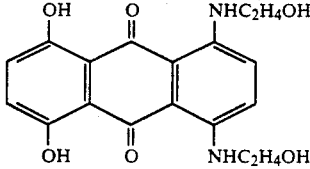 | (126) turquoise |
| 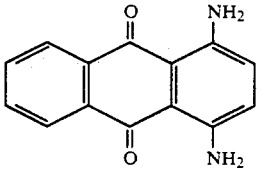 | (127) violet |
| 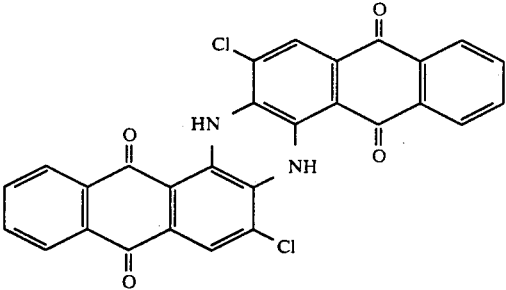 | (128) blue |
| 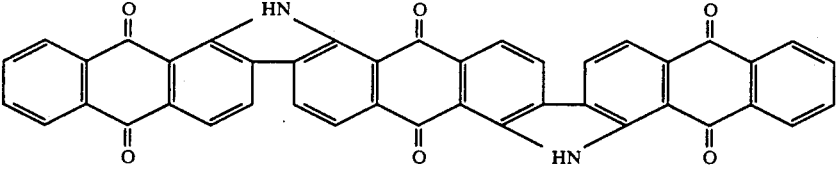 | (129) yellow |
| 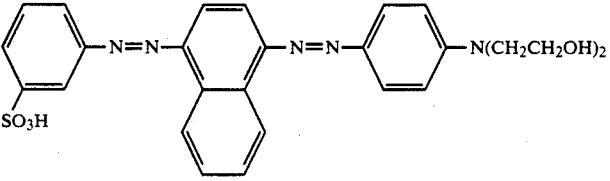 | (130) bordeaux |

-continued

| Dye | Shade |
|---|---|
| (structure: HO₃S-C₆H₄-N=N-C₆H₄-N=N-naphthyl-OH) | (131) red |
| (structure: pyrazolone azo phenol, 1:2 Cr Complex) | (132) scarlet |
| (structure: nitrophenol azo naphthol-SO₂-NHCH₃, 1:2 Co Complex) | (133) blue |
| (mixed structure, 1:2 Cr Complex) | (134) brown |
| (structure with NH-CO-CBr=CH₂ group) | (135) yellow |
| [(C₂H₅)₂N... oxazine ...N(C₂H₅)₂]⁺ ZnCl₃⁻ | (136) blue |
| [indolinium CH=N-N(CH₃)-C₆H₄-OCH₃]⁺ Cl⁻ | (137) yellow |

| Dye | Shade |
|---|---|
| 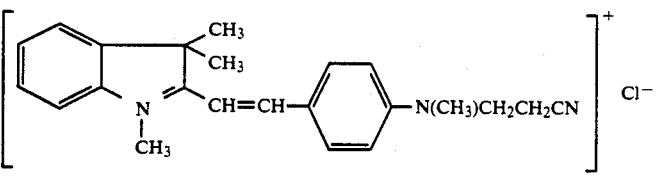 | (138) red |
| 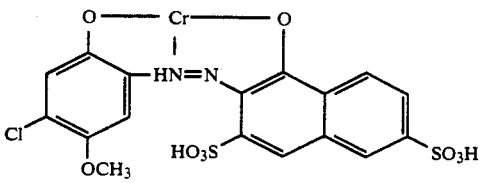 | (139) blue |
| 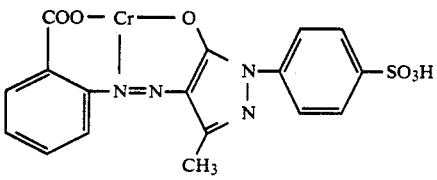 | (140) yellow |
| 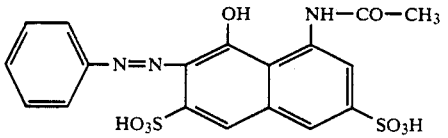 | (141) red |
| 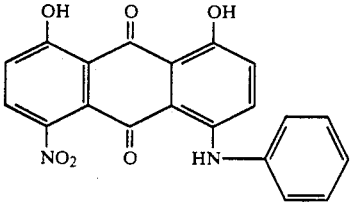 | (142) blue |
| 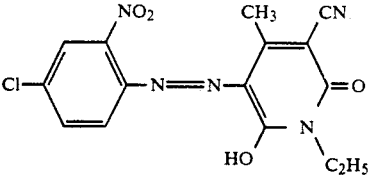 | (143) yellow |
| 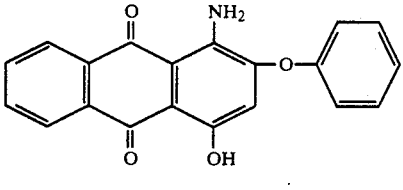 | (144) red |
| 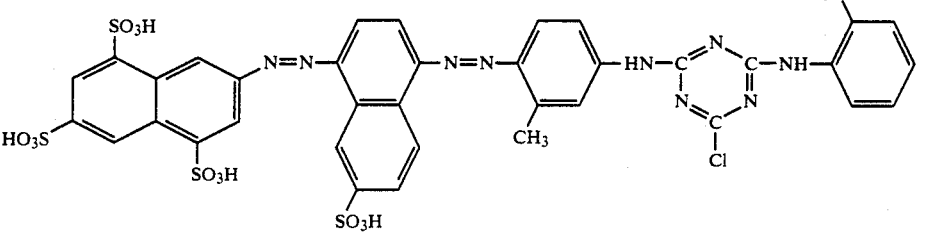 | (145) brown |

-continued
| Dye | Shade |
|---|---|
| 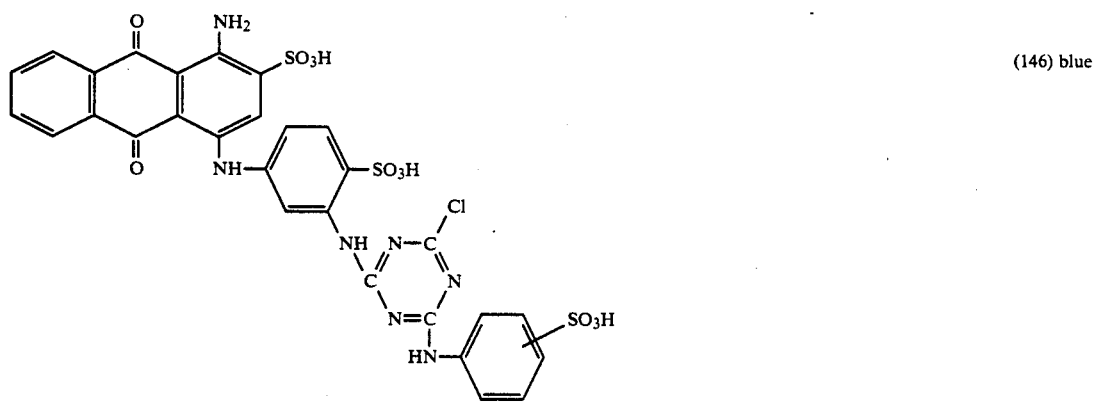 | (146) blue |
| 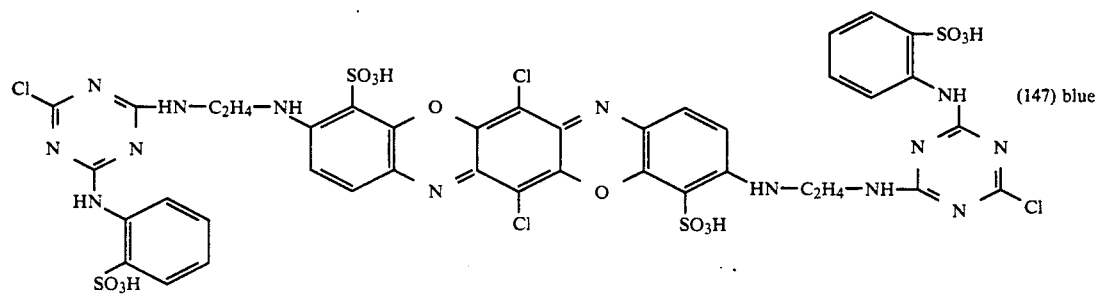 | (147) blue |
| 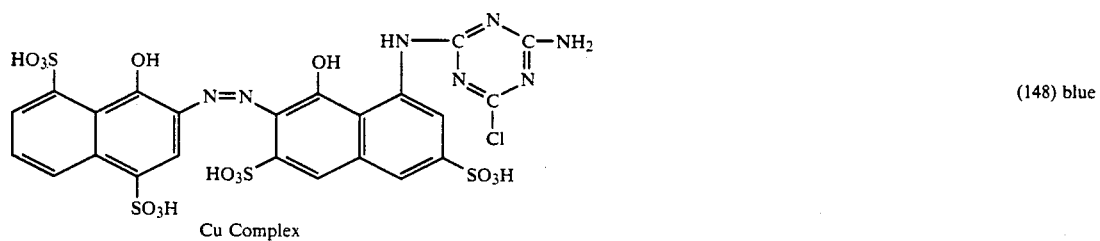 Cu Complex | (148) blue |
| 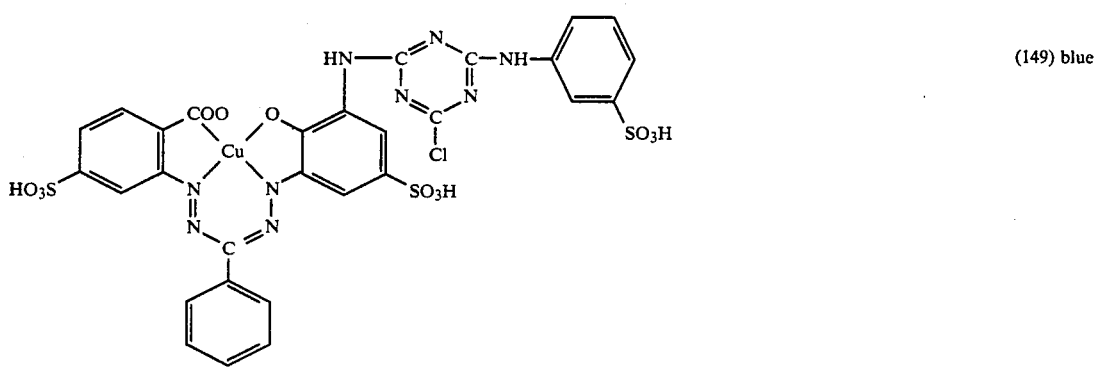 | (149) blue |

-continued
| Dye | Shade |
|---|---|
| 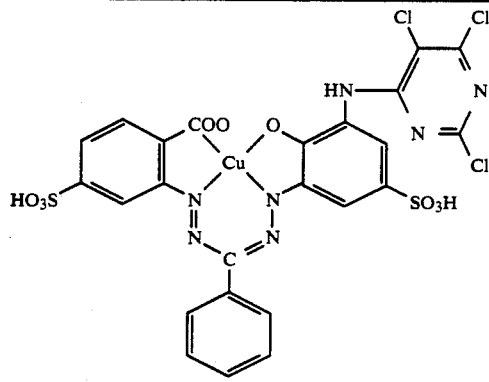 | (150) blue |
| 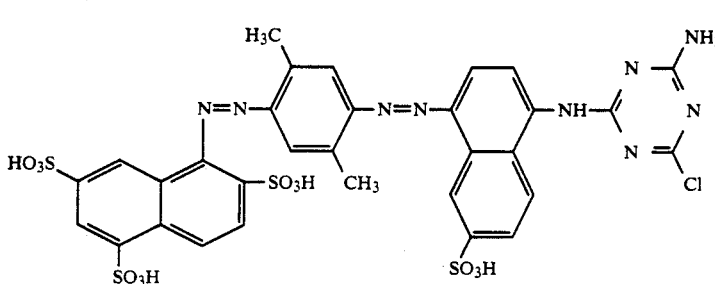 | (151) brown |
| 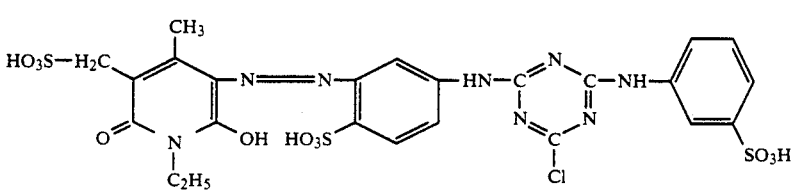 | (152) yellow |
| 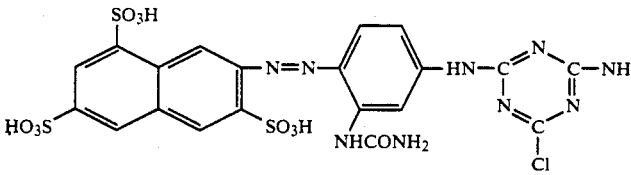 | (153) yellow |
| 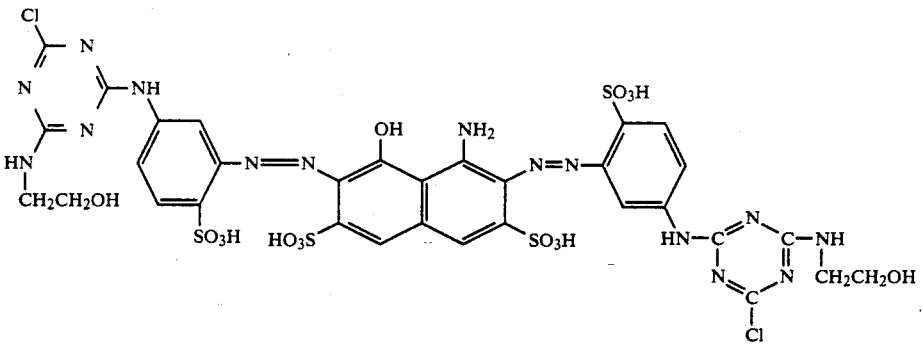 | (154) navy blue |
| 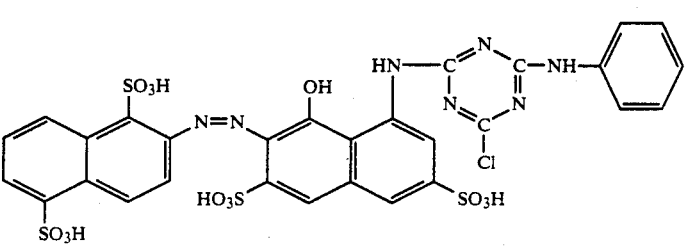 | (155) red |

What is claimed is:

1. A process for dyeing or printing of a given shade by color matching, which comprises
   a) defining a given shade in a $FTa^*b^*$ color space, where FT is a depth of shade value which, irrespective of hue, defines positions of equal color strength which by definition lie in a plane of the $FTa^*b^*$ color space, and $a^*$ and $b^*$ are values of the CIELab color coordinate system;
   b) determining $a^*$ and $b^*$ values at a given depth of shade for each dye to be used for color matching;
   c) determining $a^*$ and $b^*$ values at a given depth of shade for mixtures of two dyes to be used for color matching;
   d) segmenting the $FTa^*b^*$ color space for each depth of shade plane into triangular levels by means of the $a^*$ and $b^*$ values of the dyes to be used for color matching, wherein the corner points of triangular levels correspond to the dyes to be used for color matching and the connecting line segment between two corner points corresponds to mixtures of the two dyes represented by the two corner points;
   e) determining a ratio of dyes to be used in a dyeing or printing step by interpolation in a suitable segment from the known $a^*$ and $b^*$ values of the desired color at the desired depth of shade; and
   f) carrying out the dyeing or printing step with the ratio of the dyes obtained according to step e).

2. A process according to claim 1, which comprises recording a given colour and/or a given pattern electronically, preferably digitally, using a scanner or a video camera, displaying said colour or said pattern on a monitor and correcting it, as required, with respect to form and colour, and then printing it on any substrate by means of a printer, by means of which the colour position in the $FTa^*b^*$ colour space is defined, and is stored and can be matched.

3. A process according to claim 1, wherein all calibration data, $FT\,a^*b^*$ data, used for matching a colour are stored in a computer.

4. A process according to claim 1, wherein the desired ratio of the dyes of the segment is obtained by a computer-controlled iteration method.

5. A process according to claim 1, wherein dyes are used as corner points of a segment which meet defined criteria, especially in respect of application properties.

6. A process according to claim 1 for formulating printing recipes.

7. A process according to claim 1, wherein the dyes used for matching the given shade are selected from the group consisting of disperse, acid, metal complex, reactive, vat, sulfur, direct and pigment dyes, cationic dyes, natural dyes, development dyes and food dyes.

8. A process according to claim 1, wherein the dyeing and printing recipes are used on all substrates.

9. Use of the process as claimed in claim 1 for obtaining a dyeing or a print according to a reference shade.

10. Method of use of the process according to claim 1 in a computer-controlled dyeing procedure or a computer-controlled printing procedure.

11. A system for competing a dyeing or printing recipe according to a given shade according to claim 1, comprising
   a) a scanner or a video camera for digitalising a reference shade,
   b) a computer-aided design apparatus for displaying and correcting the reference shade on a monitor,
   c) a colour printer, for example an ink-jet printer, for displaying the reference shade or the corrected shade on any substrate and for calculating the coordinates for each shade or each corrected shade in the $FT\text{-}a^*b^*$ colour space,
   d) a computer which stores the $FTa^*b^*$ data of the dyes to be used and and computes the recipe by means of an iteration method.

* * * * *